(12) United States Patent
Brochard et al.

(10) Patent No.: US 9,975,641 B2
(45) Date of Patent: May 22, 2018

(54) AIRCRAFT PROPELLING ASSEMBLY INCLUDING A DUCT FORMING A THERMAL BARRIER INTEGRATED IN THE CAISSON OF THE RIGID STRUCTURE OF THE ENGINE MOUNTING SYSTEM

(71) Applicant: Airbus Operations (SAS), Toulouse (FR)

(72) Inventors: Wolfgang Brochard, Toulouse (FR); Misael Hernandez-Perez, Toulouse (FR); Yves Belloc, Bondigoux (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 28 days.

(21) Appl. No.: 14/707,240

(22) Filed: May 8, 2015

(65) Prior Publication Data
US 2015/0321765 A1 Nov. 12, 2015

(30) Foreign Application Priority Data
May 9, 2014 (FR) ...................................... 14 54183

(51) Int. Cl.
*B64D 27/26* (2006.01)
*F28F 3/02* (2006.01)

(52) U.S. Cl.
CPC .............. *B64D 27/26* (2013.01); *F28F 3/02* (2013.01); *B64D 2027/264* (2013.01); *B64D 2027/266* (2013.01)

(58) Field of Classification Search
CPC .............. F28F 3/02; B64D 2027/266; B64D 2027/264
USPC ........................................................ 244/54
See application file for complete search history.

(56) References Cited

U.S. PATENT DOCUMENTS

| 3,893,638 | A |  | 7/1975 | Kelley |  |
|---|---|---|---|---|---|
| 4,712,750 | A | * | 12/1987 | Ridgwell | B64C 7/02 244/117 A |
| 5,123,242 | A |  | 6/1992 | Miller |  |
| 7,971,826 | B2 | * | 7/2011 | Journade | B64D 27/26 244/54 |
| 8,607,453 | B2 | * | 12/2013 | Machado | B64C 7/02 244/131 |
| 8,814,080 | B2 | * | 8/2014 | Dumont | B64D 29/02 244/121 |
| 9,010,680 | B2 | * | 4/2015 | Morvant | B64D 29/02 244/54 |
| 9,238,511 | B2 | * | 1/2016 | Woolley | B64D 27/26 |

(Continued)

FOREIGN PATENT DOCUMENTS

| FR | 2891255 | 3/2007 |
|---|---|---|
| FR | 2931133 | 11/2009 |
| WO | 2007036521 | 4/2007 |

OTHER PUBLICATIONS

French Search Report, dated Jan. 16, 2015.

*Primary Examiner* — Brian M O'Hara
*Assistant Examiner* — Keith L Dixon
(74) *Attorney, Agent, or Firm* — Greer, Burns & Crain, Ltd.

(57) ABSTRACT

Housing a conduit of a thermal protection system of a rigid structure of an attachment pylon in an aircraft propulsion assembly within a box of the rigid structure, so as to take advantage of the volume within the rigid structure. The elements forming the conduits thus form an integral part of the rigid structure and can thus play a structural role.

14 Claims, 7 Drawing Sheets

(56) References Cited

U.S. PATENT DOCUMENTS

| | | |
|---|---|---|
| 2008/0224018 A1 | 9/2008 | Lafont et al. |
| 2009/0095443 A1* | 4/2009 | Connelly ................ B64D 33/04 165/51 |
| 2011/0036942 A1 | 2/2011 | March et al. |
| 2011/0155847 A1* | 6/2011 | Journade ................ B64D 29/02 244/54 |
| 2012/0080554 A1 | 4/2012 | Lafont et al. |

* cited by examiner

AIRCRAFT PROPELLING ASSEMBLY INCLUDING A DUCT FORMING A THERMAL BARRIER INTEGRATED IN THE CAISSON OF THE RIGID STRUCTURE OF THE ENGINE MOUNTING SYSTEM

CROSS-REFERENCES TO RELATED APPLICATIONS

This application claims the benefit of French patent application No. 1454183 filed on May 9, 2014, the entire disclosures of which are incorporated herein by way of reference.

BACKGROUND OF THE INVENTION

The present invention relates to the field of engine attachment pylons designed to be interposed between an aircraft wing and an engine, and more particularly to a propulsion assembly comprising such an attachment pylon.

The invention can be used on any type of aircraft equipped for example with jet engines or turboprops.

This type of attachment pylon, also called "EMS" (Engine Mounting Structure), makes it possible, for example, to hang an aircraft engine beneath the wing of the aircraft, or to mount such an engine above the wing.

In general, such an attachment pylon is provided in order to constitute the connection interface between an aircraft engine and the wing of the aircraft. It allows the forces generated by the engine to be transmitted to the structure of the aircraft, and also makes it possible to route fuel, electrical, hydraulic and air systems between the engine and the airframe of the aircraft.

In order to ensure the transmission of forces, the attachment pylon comprises a rigid structure, also called the "primary structure," which is in general of the "box" type, that is to say formed by an assembly of upper and lower closing spars and of two closing panels or sidewalls. These elements are in general connected to one another via the intermediary of transverse stiffening ribs, when the dimensions of the box justify this.

In addition, the attachment pylon is provided with a mounting system interposed between the engine and the rigid structure of the attachment pylon. This mounting system comprises, overall, at least two engine attachments, generally a forward attachment and an aft attachment.

Moreover, the mounting system comprises in general a device for taking up the thrust forces generated by the engine. In the prior art, this device takes the form, for example, of two lateral struts connected, on one hand, to an aft part of the hub of the intermediate casing arranged in the continuation of the fan casing of the jet engine, or to a forward part of the casing surrounding the core of the jet engine, and, on the other hand, to the aft engine attachment fixed to the casing of the latter.

In the same manner, the attachment pylon also comprises a second mounting system interposed between the rigid structure of this pylon and the wing of the aircraft, this second system habitually consisting of multiple attachments.

Finally, the attachment pylon is provided with a secondary structure which separates and holds the systems while supporting aerodynamic fairings, of which the aft aerodynamic fairing habitually projects rearwards beyond the trailing edge of the wing.

Furthermore, the propulsion assembly is generally equipped with a thermal protection system to protect the box of the rigid structure of the attachment pylon from the heat given off by the engine. Such a thermal protection system comprises a conduit arranged beneath the box to allow a flow of relatively fresh air between the box and the engine, so as to maintain a moderate temperature within the primary structure, in particular with respect to the systems housed within this structure.

However, the arrangement of this conduit beneath the box results in the need to assign a specific volume to the conduit when designing and dimensioning the propulsion assembly. By contrast, it is desirable for aircraft designers to be able to break free from this restriction.

Moreover, such an arrangement of the conduit results in an increase in mass, which is not desirable.

The applicant's international application WO 2007/036521 describes an example of a known type of propulsion assembly, illustrating the problems explained above.

SUMMARY OF THE INVENTION

The invention aims, in particular, to provide a simple, economical and effective solution to these problems, making it possible to at least partially avoid the abovementioned drawbacks.

The invention proposes, to that end, a propulsion assembly for an aircraft, comprising an engine and an attachment pylon designed for attaching the engine to the wing of an aircraft, the attachment pylon comprising:

a rigid structure comprising a box comprising a first closing spar, a second closing spar opposite the first closing spar, two closing sidewalls each having a first end fixed to the first closing spar and a second end fixed to the second closing spar, and an internal spar having lateral ends connected to said closing sidewalls, said internal spar extending between said first closing spar and said second closing spar;

a mounting system attaching the engine to the box, and a thermal protection system comprising a conduit forming a thermal barrier to protect the box from the heat of the engine.

According to the invention, said conduit is housed within said box and is delimited by the first closing spar, by the internal spar, and by the closing sidewalls.

Thus, the internal volume of the box is used to house the conduit of the thermal protection system, such that the latter no longer requires specific volume to be taken into account when designing the propulsion assembly.

By integrating into the rigid structure the elements forming the conduit, these elements can be used to aid in transferring the engine support and thrust forces to the wing of the aircraft. These elements can thus have a structural function in addition to their function of delimiting an air flow duct.

Preferably, said mounting system comprises an aft engine attachment, and said rigid structure of the attachment pylon comprises a structural block comprising:

a fixing plate pressed against said first closing spar and fixed to the latter by means of fasteners passing through the first closing spar and said internal spar, and a fixing interface for said aft engine attachment.

Preferably, said thermal protection system comprises spacers connecting said first closing spar to said internal spar, passing through said conduit, each spacer including at least one orifice for one of said fasteners to pass through said structural block.

Preferably, a first region of said conduit, located facing said structural block, has a cross section which is widened in the direction from said first closing spar towards said internal spar.

Said widened cross section of said first region of the conduit is advantageously dimensioned such that the effective air passage cross section is constant along the length of said conduit.

Preferably, a second region of said conduit, through which there passes an air supply duct designed to be connected to the airframe of an aircraft, has a cross section which is widened in the direction from said first closing spar towards said internal spar.

Said widened cross section of said second region of the conduit is advantageously dimensioned such that the effective air passage cross section is constant along the length of said conduit.

Preferably, said mounting system comprises a forward engine attachment having a fixing plate pressed against said first closing spar and fixed to the latter.

Preferably, said thermal protection system comprises a longitudinal partition wall which extends between said first closing spar and said internal spar and which is connected to said closing sidewalls, so as to partition a central region of the conduit into two parts.

Preferably, said box comprises a forward closing rib connecting a forward end of said first closing spar to a forward end of said second closing spar.

Preferably, said box comprises an aft closing rib connecting an aft end of said first closing spar to an aft end of said second closing spar.

Preferably, said box comprises internal stiffening ribs having one end connected to said internal spar and an opposite end connected to said second closing spar.

Preferably, said thermal protection system comprises at least one air inlet connected to said conduit and opening through one of said closing sidewalls or through said first closing spar.

Preferably, said thermal protection system comprises at least one air outlet connected to said conduit and opening through one of said closing sidewalls or through said first closing spar.

Preferably, said thermal protection system comprises longitudinal ribs for stiffening against buckling, said longitudinal ribs forming heat exchange fins.

The invention also relates to an aircraft comprising at least one propulsion assembly of the type described hereinabove.

BRIEF DESCRIPTION OF THE DRAWINGS

The invention will be better understood, and other details, advantages and features thereof will emerge from reading the following description given as a non-limiting example and with reference to the appended drawings, in which.

In all of these figures, identical references can designate identical or similar elements.

DETAILED DESCRIPTION OF THE PREFERRED EMBODIMENTS

Figure 1:
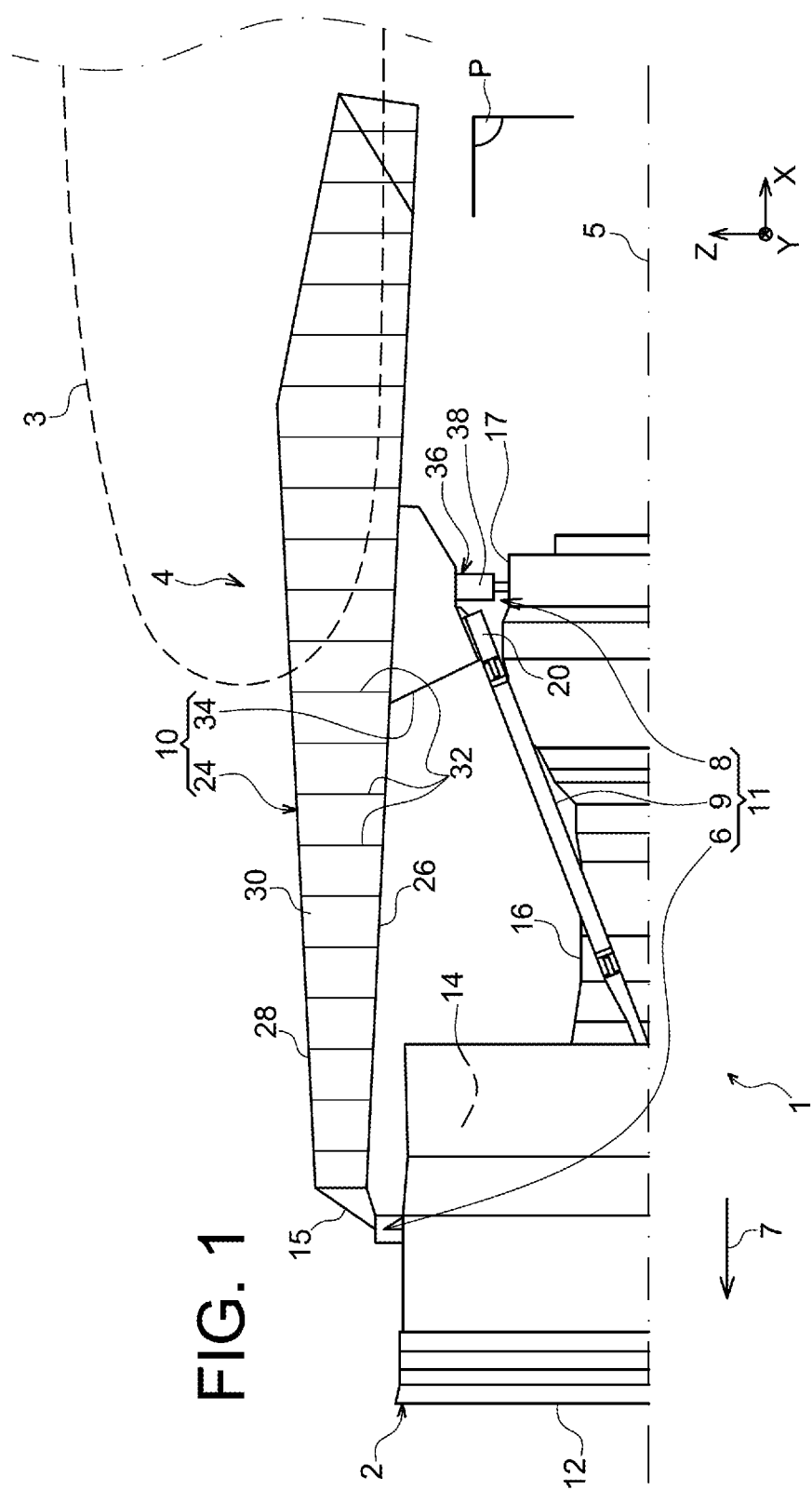
FIG. 1 is a partial schematic view in axial section of a propulsion assembly according to a preferred embodiment of the invention.

FIG. 1 illustrates an aircraft, more particularly a propulsion assembly 1 fixed beneath a wing 3 of this aircraft. Overall, the propulsion assembly 1 comprises an engine 2 such as a jet engine and an attachment pylon 4, the latter comprising in particular a rigid structure 10 and a mounting system 11 comprising a plurality of engine attachments 6, 8 and a device for taking up thrust forces 9. The mounting system 11 is interposed between the engine 2 and the rigid structure 10. By way of indication, the propulsion assembly 1 is designed to be surrounded by a nacelle (not shown in this figure), and the attachment pylon 4 comprises another set of attachments (not shown) by means of which it is possible to hang the propulsion assembly 1 beneath the wing 3 of the aircraft.

In the following description, the X direction is the longitudinal direction of the attachment pylon 4, which can also be considered to coincide with the longitudinal direction of the jet engine 2, this X direction being parallel to a longitudinal axis 5 of this jet engine 2. Furthermore, the Y direction is the direction oriented transversely with respect to the pylon 4, and can also be considered to coincide with the transverse direction of the jet engine 2, and the Z direction is the vertical or height direction, these three directions X, Y and Z being mutually orthogonal.

Furthermore, the terms "forward" and "aft" are to be considered with respect to a direction of flight of the aircraft, encountered as a consequence of the thrust exerted by the jet engine 2, this direction being represented schematically by the arrow 7.

The jet engine 2 has, at the front, a large fan casing 12 delimiting an annular fan duct 14, and comprises, towards the rear, a smaller central casing 16 which encloses the core of the jet engine. Finally, the central casing 16 extends rearwards by an exhaust casing 17 which is larger than the central casing 16. The casings 12, 16 and 17 are of course secured to one another.

As shown in FIG. 1, the plurality of engine attachments comprises a forward engine attachment 6 and an aft engine attachment 8 for example formed of two aft half-attachments, in a manner which is well known. The device for taking up thrust forces 9 takes the form for example of two lateral struts (only one being shown because of the side view) connected on one hand to an aft part of the hub of the intermediate casing arranged in the continuation of the fan casing 12, and furthermore to a spreader 20 which is itself mounted on the rigid structure 10.

The forward engine attachment 6, secured to the fitting 15 of the rigid structure 10 and to the fan casing 12, is conventionally designed so as to be able to take up only forces generated by the jet engine 2 in the Y and Z directions, and thus not those acting in the X direction. By way of indication, this forward attachment 6 preferably enters a circumferential end portion of the fan casing 12.

The aft engine attachment 8 is generally interposed between the exhaust casing 17 and the rigid structure 10 of the pylon. As indicated above, it is preferably designed so as to be able to take up forces generated by the jet engine 2 in the Y and Z directions, but not those acting in the X direction.

Thus, with the isostatic mounting system 11, the forces acting in the X direction are taken up with the aid of the device 9, and the forces acting in the Y and Z directions are taken up conjointly with the aid of the forward attachment 6 and the aft attachment 8.

Furthermore, the moment acting about the X direction is taken up vertically with the aid of the attachment 8, the moment acting about the Y direction is taken up vertically with the aid of the aft attachment 8 in conjunction with the attachment 6, and the moment acting in the Z direction is taken up transversely with the aid of the attachment 8, in conjunction with the attachment 6.

Still referring to FIG. 1, the rigid structure 10 has a box 24 extending in the X direction from one end of the rigid structure 10 to the other, and thus forms a torsion box, sometimes called "main box," of the structure. This box 24 is formed by a first closing spar 26, also termed "lower spar" when the propulsion assembly is designed to be mounted beneath the wing as in the example shown, a second closing spar 28, also termed "upper spar" in this case, and by two closing sidewalls 30 (only one being visible in FIG. 1), each one extending in the X direction, substantially in a plane XZ. In the case of a propulsion assembly designed to be mounted above the wing, the first closing spar 26 forms an "upper spar" while the second closing spar 28 forms a "lower spar."

Within the box 24, transverse stiffening ribs 32, arranged substantially in planes YZ and spaced apart in the longitudinal direction, reinforce the stiffness of the box 24. By way of indication, each one of the elements 26, 28 and 30 may be created in one piece or, as a variant, each one may be formed from an assembly of adjacent panels, which may be slightly inclined with respect to one another.

As shown in FIG. 1, the rigid structure 10 further comprises a structural block 34 mounted in a fixed manner on the outer surface of the first closing spar 26. The structural block 34 has a fixing interface 36 for the aft engine attachment 8, this interface 36 being thus located beneath the plane in which is located the spar 28. This fixing interface 36 comprises for example devises 38 on which are articulated shackles also designed to be articulated on fittings secured to the engine, in a manner known per se. The set of shackles then forms the aft engine attachment 8.

Moreover, the structural block 34 comprises a fitting for fixing the spreader 20, arranged preferably forward of the fixing interface 36.

Figure 2:
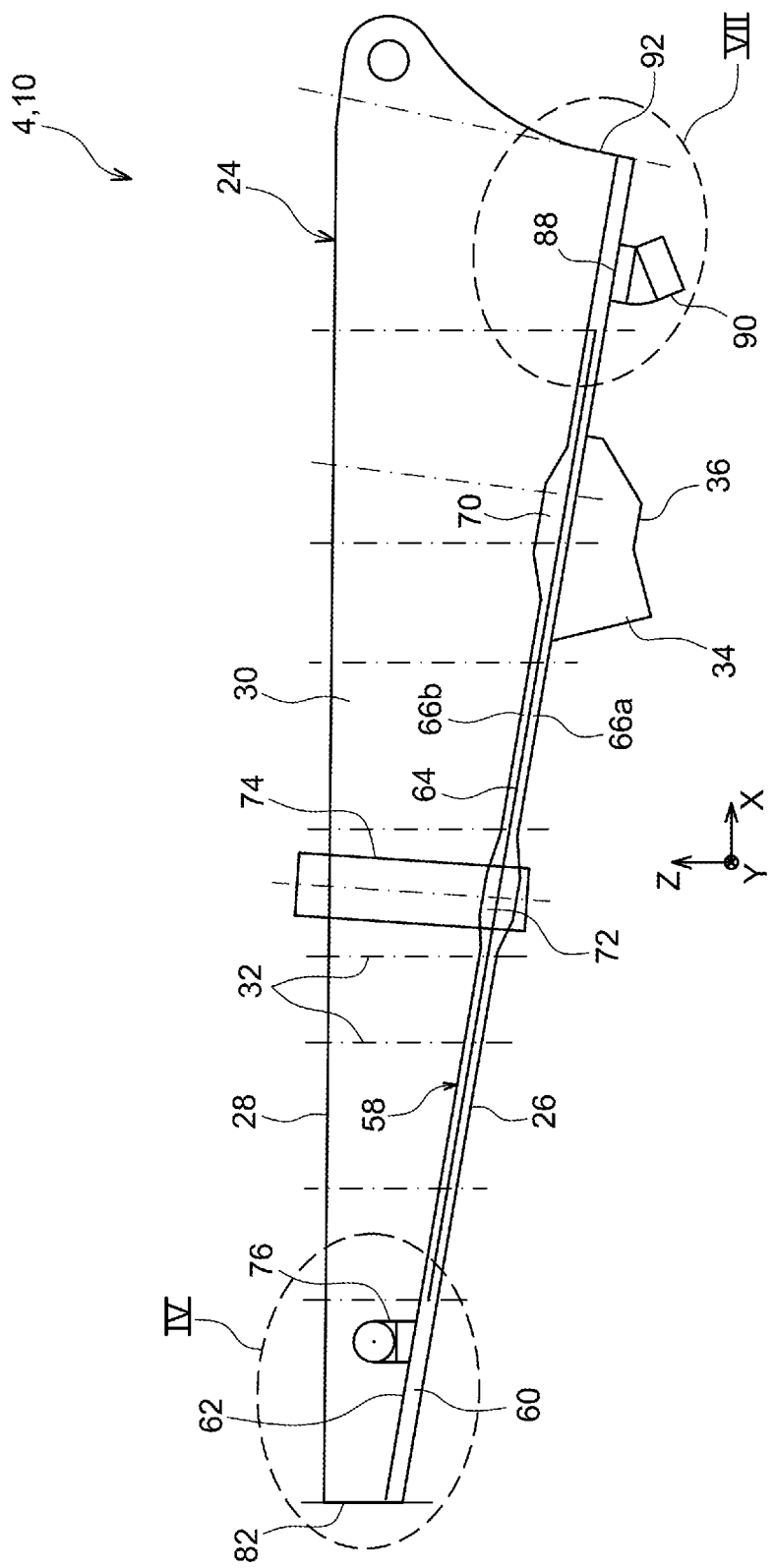
FIG. 2 is a partial schematic view in axial section of a box belonging to a rigid structure of an attachment pylon of the propulsion assembly of FIG. 1.

With reference to FIG. 2, the attachment pylon 4 comprises a thermal protection system 58 for the box 24, comprising principally a conduit 60 housed within the box 24. This conduit 60 is designed for a flow of relatively fresh air to flow through it so as to form a thermal barrier with respect to the hotter gases from the engine.

The conduit 60 is delimited by the first closing spar 26 and by an internal spar 62. This internal spar 62 has lateral ends connected to the closing sidewalls 30 and extends parallel to the first closing spar 26, between the first closing spar 26 and the second closing spar 28. Moreover, the conduit 60 is delimited laterally by each one of the closing sidewalls 30. The internal spar 62 is arranged closer from the first closing spar 26 than from the second closing spar 28. Generally speaking, the internal spar 62 is arranged sufficiently close to the first closing spar 26 for the air flowing through the conduit 60 to form an efficient thermal barrier.

Furthermore, the thermal protection system 58 comprises a longitudinal partition wall 64 which extends between the first closing spar 26 and the internal spar 62. This longitudinal partition wall 64 is connected, by its lateral ends, to the closing sidewalls 30, so as to partition a central region of the conduit 60 into two parts 66a, 66b. The longitudinal partition wall 64 makes it possible, in particular, to split the flow of relatively fresh air into two layers of air, so as to increase the effectiveness of the thermal barrier. Moreover, dividing the flow of air into two parts makes it possible to provide redundancy such that, in the event of a fault, such as partial or total obstruction of one of the parts 66a, 66b of the conduit 60, the other part continues to provide the thermal protection function of the system 58. Such redundancy is frequently termed a "fail-safe function."

As shown also in FIG. 2, the conduit 60 comprises a first region 70, located facing the structural block 34, and having a cross section which is widened in the direction from the first closing spar 26 towards the internal spar 62, that is to say in a direction orthogonal to the first closing spar 26. The widening of the conduit 60 at this first region 70 makes it possible to ensure that the effective air passage cross section is substantially constant within the conduit 60 in spite of the presence of fasteners of the structural block 34 within the conduit, as will be made clearer below.

Similarly, the conduit 60 has a second region 72, which is for example located forward of the abovementioned first region 70, and which also has a cross section which is widened in the direction from the first closing spar 26 towards the internal spar 62. The widening of the conduit 60 at this second region 70 makes it possible to ensure that the effective air passage cross section is substantially constant within the conduit 60 in spite of the presence of an air supply duct 74 which is designed to have its outlet connected to the airframe of the aircraft and its inlet connected to a heat exchanger fitted to the engine, in particular in order to condition and pressurize the air within the cabin of the aircraft.

Figure 3:
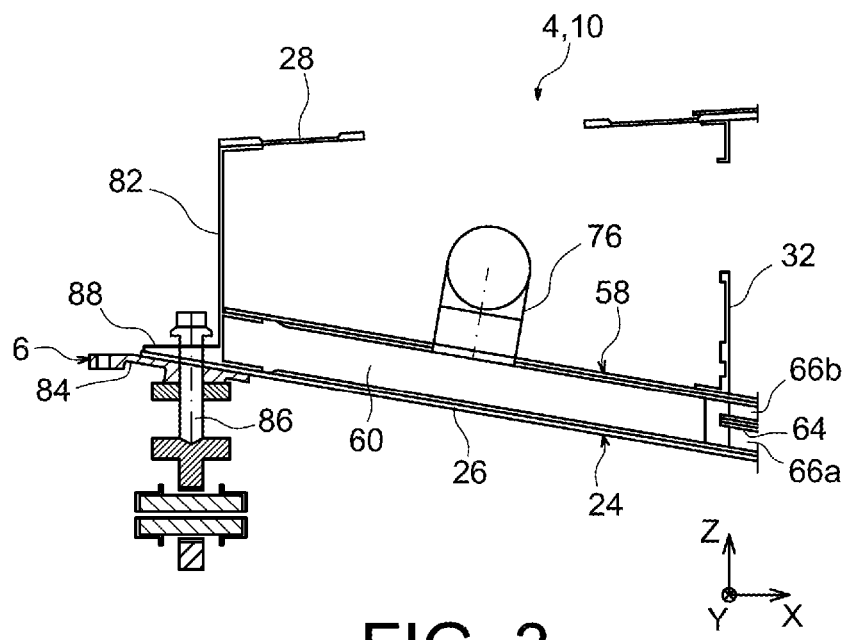
FIG. 3 is an enlarged view of the detail IV of FIG. 2 showing part of a forward end of the rigid structure of the attachment pylon.
Figure 4:
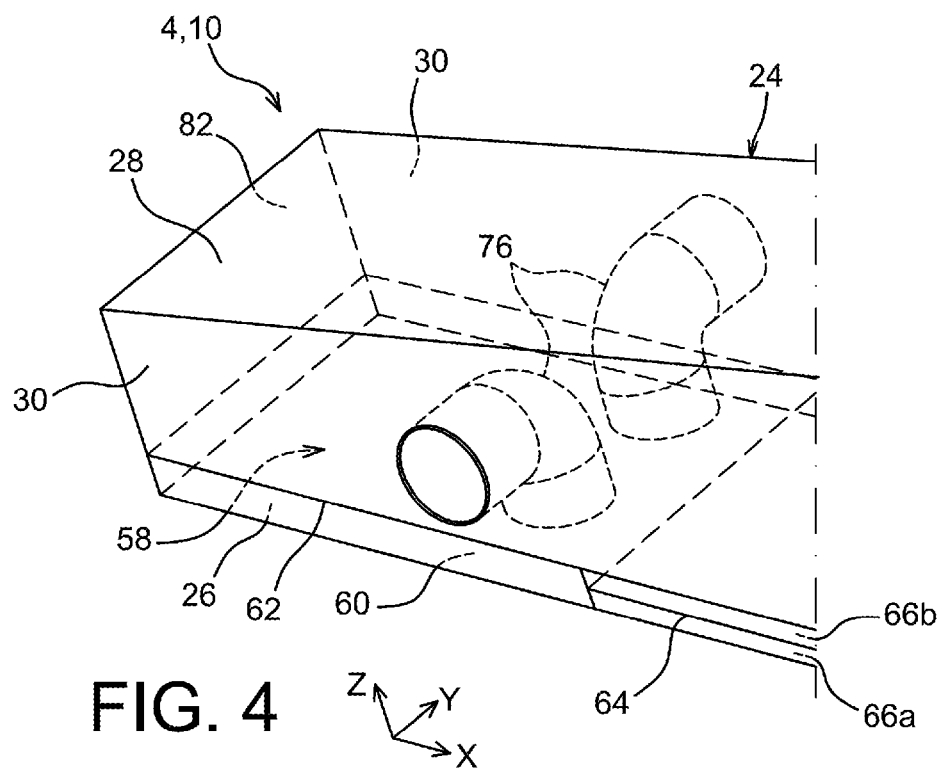
FIG. 4 is a partial schematic view in perspective of the part of the forward end of the rigid structure of the attachment pylon.

As shown in FIGS. 2, 3 and 4, the thermal protection system 58 moreover comprises two air inlets 76, which for example take the form of two bent tubes, each one being connected to the conduit 60 through the internal spar 62, and opening respectively through said closing sidewalls 30 of the box 24, preferably forward of a forward end of the longitudinal partition wall 64.

As a variant, the thermal protection system 58 may comprise a different number of air inlets, for example a single air inlet.

Figure 5:
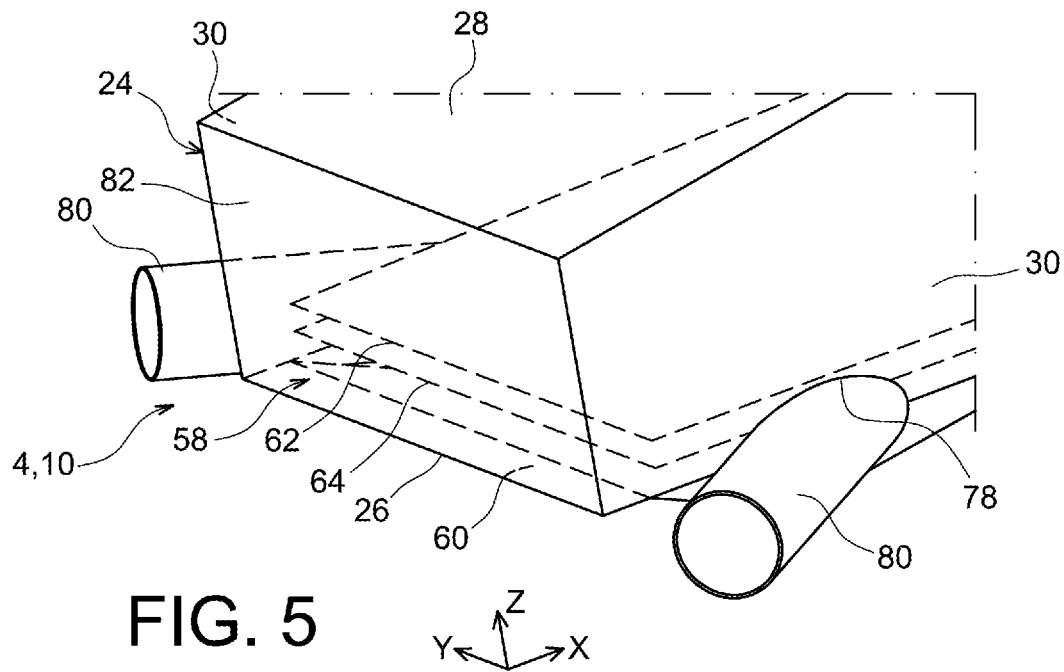
FIG. 5 is a partial schematic view in perspective of a variant embodiment of the part of the forward end of the rigid structure of the attachment pylon.

As another variant, as shown in FIG. 5, the air inlets may take the form of orifices 78 created respectively in the closing sidewalls 30 facing the conduit 60. These orifices are preferably extended towards the exterior of the box 24 by means of air bleed tubes 80.

In the example shown, the air inlets are connected to respective conduits (not shown) which open through the fan casing 12, in the secondary flow duct of the engine.

As a variant, the air inlets may be connected to respective conduits which open through the central casing 16, in the primary flow duct of the engine, within a compressor of the engine.

As a variant, the air inlets may be connected to a cooling air circuit also designed to supply a heat exchanger for cooling the air flowing in the air supply duct 74 which is designed to be connected to the airframe of the aircraft.

FIGS. 2 to 4 show, moreover, a forward closing rib 82 of the box 24. This rib 82 connects a forward end of the first closing spar 26 to a forward end of the second closing spar 28.

FIG. 3 also shows a part of the forward engine attachment 6, more precisely a fixing plate 84 belonging to this engine attachment and pressed against the first closing spar 26, and fixed to the latter by means of through fasteners 86. In the example shown, these fasteners make it possible to fix the forward engine attachment 6 simultaneously to the first closing spar 26 and to a base 88 of the forward closing rib 82.

Figure 6:
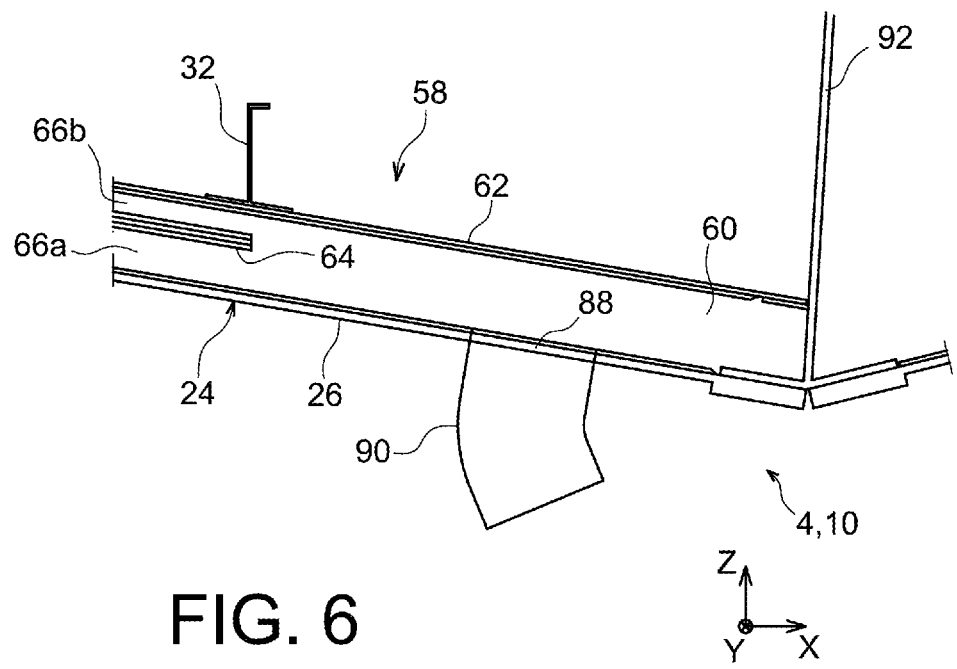
FIG. 6 is an enlarged view of the detail VII of FIG. 2 showing a part of an aft end of the rigid structure of the attachment pylon.

As shown in FIG. 6, the thermal protection system 58 moreover comprises two air outlets, which for example take the form of orifices 88 which are adjacent in the Y direction and are created in the first closing spar 26 facing the conduit 60, aft of an aft end of the longitudinal partition wall 64. These orifices are preferably extended towards the exterior of the box 24 by means of respective air guiding tubes 90. In FIG. 6 showing a side view of the box 24, one of the air outlets is concealed by the other air outlet.

In the example shown, the air outlets open, via the intermediary of the air guiding tubes 90, within an aft aerodynamic fairing (not shown) of the attachment pylon 4, of the type frequently termed "APF" or "Aft Pylon Fairing."

As a variant, the air outlets may open beneath such an aft aerodynamic fairing, at a small distance from a lower heat shield of this fairing, so as to form an air film along this heat shield.

FIG. 6 moreover shows an aft closing rib 92 of the box 24, connecting an aft end of the first closing spar 26 to an aft end of the second closing spar 28.

Figure 7:
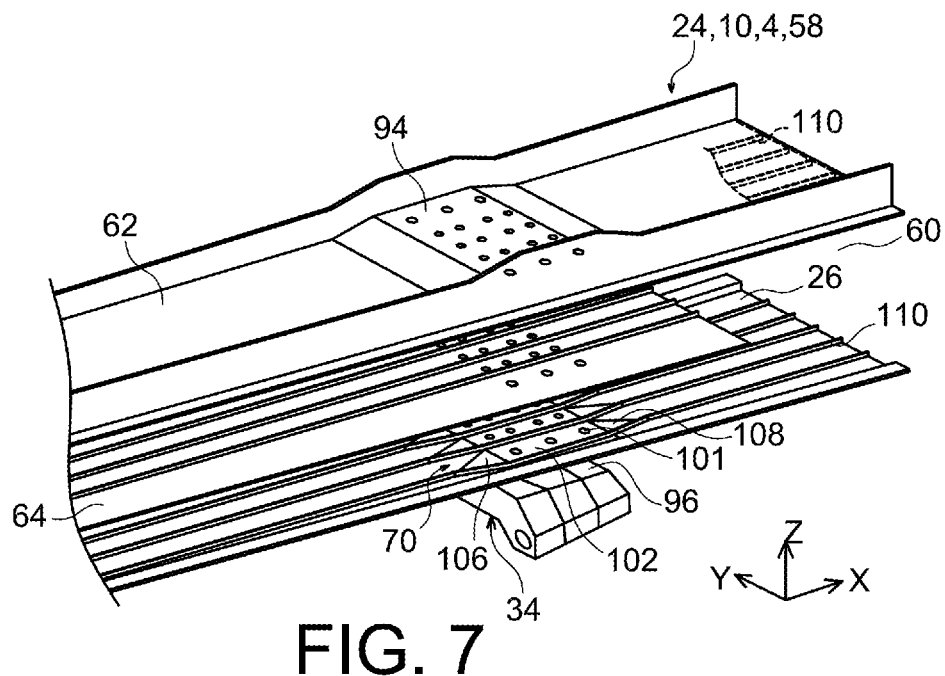
FIG. 7 is a partial schematic exploded view in perspective of the rigid structure of the attachment pylon of the propulsion assembly of FIG. 1.
Figure 8:
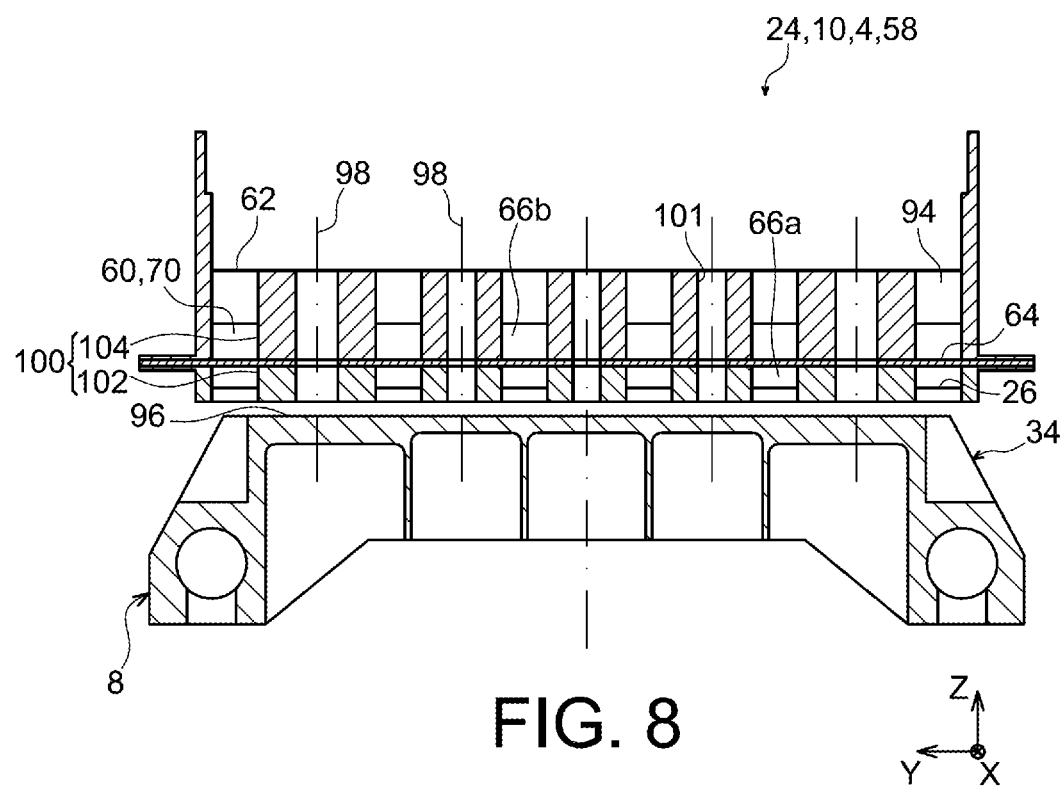
FIG. 8 is a partial schematic view in transverse section of the rigid structure of the attachment pylon of the propulsion assembly of FIG. 1, showing a first region of the box of FIG. 2, located facing the structural block.

FIGS. 7 and 8 show more particularly the abovementioned first region 70 of the conduit 60 and the structural block 34 arranged facing this region 70. In the example shown, the conduit is widened in the first region 70 by means of a setback 94 formed in the internal spar 62. This setback 94 comprises a portion of the spar projecting outwards from the conduit 60, that is to say, in the opposite direction from the first closing spar 26.

The structural block 34 comprises a fixing plate 96 pressed against the first closing spar 26 and fixed to the latter by means of fasteners such as tension bolts passing through the first closing spar 26 and the internal spar 62. In FIG. 8, these fasteners are symbolized by their respective axes 98. In the example shown, the fasteners moreover pass through the longitudinal partition wall 64. The fasteners are for example distributed in five longitudinal rows, each one comprising three fasteners.

Advantageously, the fasteners are guided within spacers 100 extending within the conduit 60, generally from the first closing spar 26 to the internal spar 62. To that end, the spacers 100 comprise orifices 101 or bores for the fasteners to pass through.

As shown in FIG. 8, these spacers 100 are for example formed from first portions 102 integrated into the first closing spar 26 and projecting towards the internal spar 62, up to the longitudinal partition wall 64, and from second portions 104 integrated into the internal spar 62 and projecting towards the first closing spar 26, also up to the longitudinal partition wall 64. Each one of these spacers 100 advantageously has forward 106 and aft 108 ends which are tapered (FIG. 7) so as to optimize the airflow around each spacer. To that end, it is to be noted that the spacers 100 are spaced apart from one another.

Figure 9:
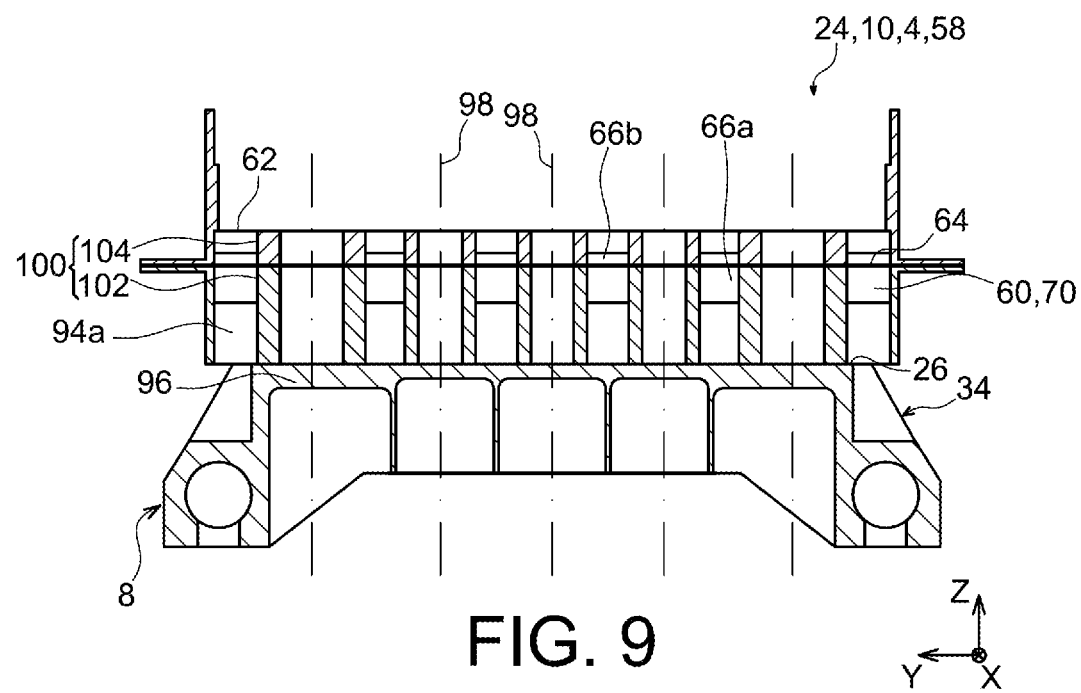
FIG. 9 is a partial schematic view in transverse section of a variant embodiment of the rigid structure of the attachment pylon of the propulsion assembly of FIG. 1.

As a variant, as shown in FIG. 9, the conduit 60 may be widened in the first region 70 by means of a setback 94a formed in the first closing spar 26. In this case, the setback 94a comprises a portion of the first closing spar 26 projecting in the opposite direction from the internal spar 62.

The conduit 60 may also be widened in the second region 72 by means of a setback formed in the internal spar 62 and/or in the first closing spar 26. In the example shown, this widening of the conduit 60 in the second region 72 is effected by means of two setbacks respectively formed in the internal spar 62 and in the first closing spar 26.

Figure 10:
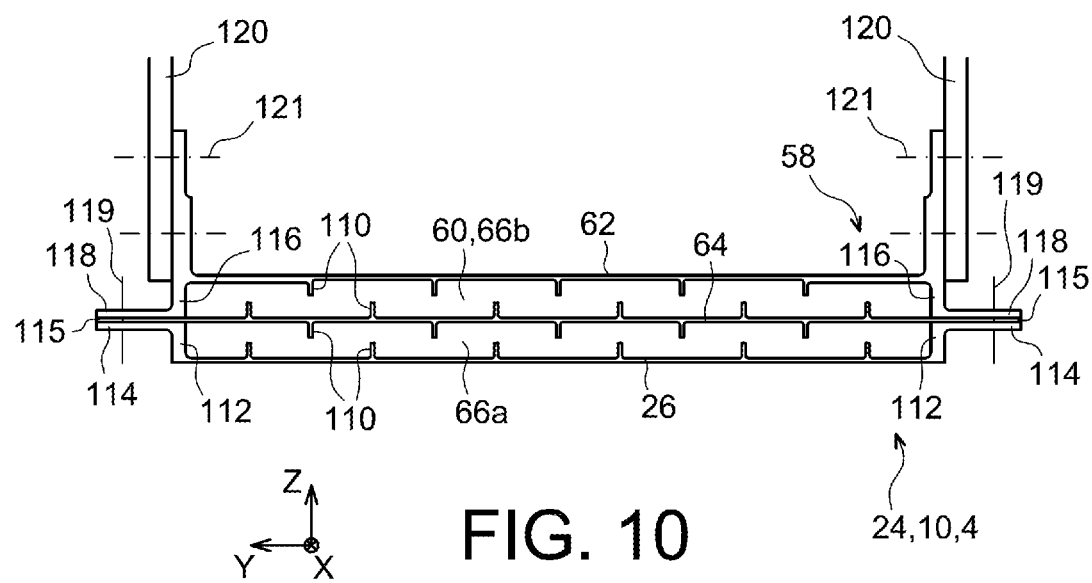
FIG. 10 is a partial schematic view in transverse section of the box of FIG. 2.

With reference to FIGS. 7 and 10, the first closing spar 26, the internal spar 62 and the longitudinal partition wall 64 preferably comprise longitudinal stiffening ribs 110 extending within the conduit 60. In addition to a stiffening function in order to remedy buckling problems, these longitudinal ribs 110 make it possible to improve the thermal exchanges between the air flowing in the conduit 60 and the spars 26 and 62. The longitudinal ribs 110 thus constitute heat exchange fins.

FIGS. 7 and 10 make it possible to show the assembly of these elements, for example by means of bolts.

To that end, the first closing spar 26 comprises for example lateral end fins 112 extending orthogonally to the spar, and provided at their respective free ends with respective rims 114 extending parallel to the spar and pressed against lateral edges 115 of the longitudinal partition wall 64.

Similarly, the internal spar 62 comprises for example lateral end fins 116 extending orthogonally to the spar, and provided at their respective free ends with respective rims 118 extending parallel to the spar and pressed against the lateral edges of the longitudinal partition wall 64.

The lateral edges of the longitudinal partition wall 64 are thus sandwiched between the rims 114 and 118, and the assembly thus formed is secured by means of bolts, or equivalent devices, defining fixing axes 119.

In the example shown, the lateral end fins 116 of the internal spar 62 also extend beyond this spar 62 towards the second closing spar of the box, and are connected respectively to lateral panels 120 of the box, for example by means of bolts defining fixing axes 121.

Thus, the sidewalls 30 of the box each comprise a lateral panel 120 (or several adjacent panels), and of the lateral end fins 112 and 116 which extend substantially in the continuation of this lateral panel 120.

It is to be noted that the spars 26, 28, 62, the closing sidewalls 30, and the longitudinal partition wall 64 are preferably made of metal, for example aluminum, titanium, steel, or a titanium-based alloy. These elements may be created by machining from solid, or by means of parts assembled by welding and possibly re-machined.

Figure 11:
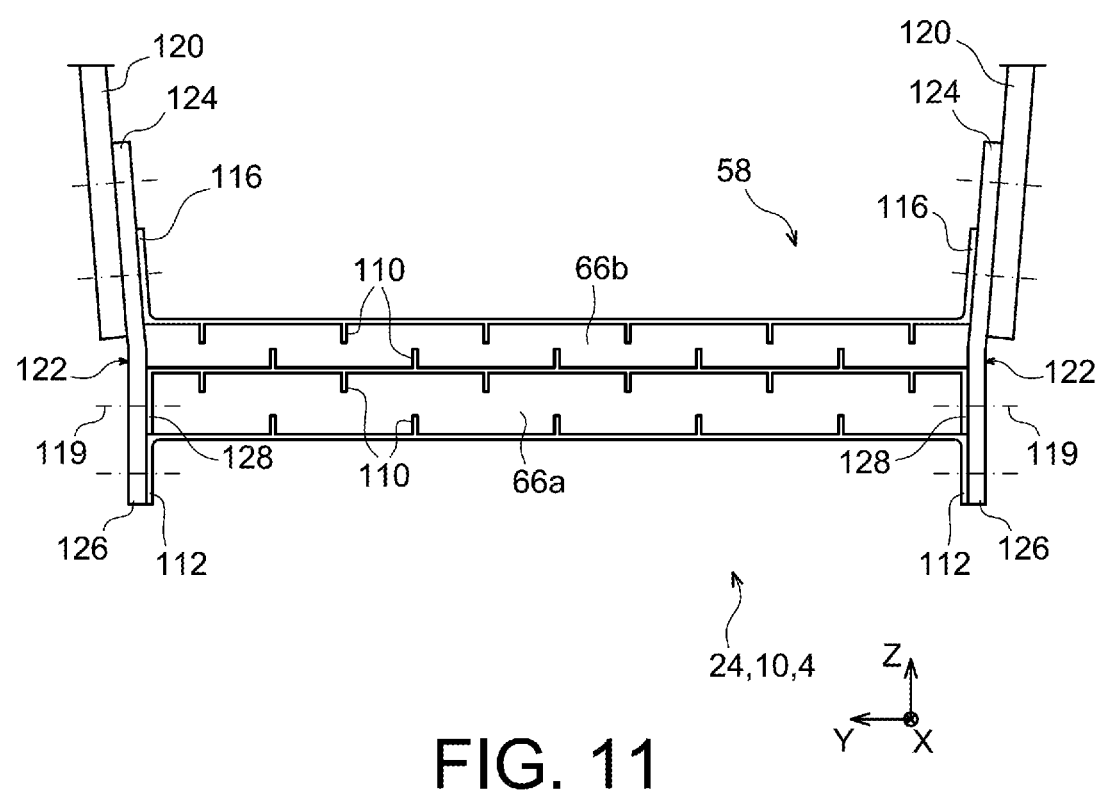
FIG. 11 is a partial schematic view in transverse section of a variant embodiment of the box of FIG. 2.

FIG. 11 illustrates a variant embodiment in which the above-described elements are assembled by means of fishplates 122, each one in the form of a plate. Each fishplate 122 comprises a first portion 124 fixed to a corresponding lateral panel 120 of the box, and a second portion 126 extending beyond the lateral panel 120. The lateral end fins 112 of the first closing spar 26 have no rims and are directly pressed against and fixed to the respective second portions 126 of the fishplates 122. This is also the case with respect to the lateral end fins 128 of the longitudinal partition wall 64. The lateral end fins 116 of the internal spar 62 are directly pressed against and fixed to the respective first portions 124 of the fishplates 122.

The fishplates 122 may be planar. As a variant, when the lateral panels 120 of the box are slightly inclined as in the example shown, the fishplates 122 may form a slight angle between their respective first and second portions 124, 126.

In operation, the relatively fresh air bled by means of the air inlets 76 flows within the conduit 60 and leaves the latter through the air outlets 90. The airflow within the conduit 60 makes it possible to protect the box 24 of the rigid structure 10 of the attachment pylon 4 from the heat radiated by the core of the jet engine.

The thermal protection system also makes it possible to fulfil a firewall function in case of an engine fire, so as to contain the fire in a dedicated zone called the "fire zone."

In order to further improve the effectiveness of the thermal protection system 58, it may moreover comprise a thermal protection blanket arranged beneath the first closing spar 26, that is to say on that face of the latter which is located on the outer side of the box 24. Such a thermal protection blanket is made of insulating materials (of the microporous, aerogel, etc. type) and makes it possible to increase the effectiveness of the thermal protection system.

Other manners of assembling the above-described elements are of course possible without departing from the scope of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, comprising:
an engine and
an attachment pylon designed for attaching the engine to a wing of the aircraft, said attachment pylon comprising:
  a rigid structure comprising
    a box comprising a first closing spar,
    a second closing spar opposite the first closing spar,
    two closing sidewalls each having a first end fixed to the first closing spar and a second end fixed to the second closing spar, and
    an internal spar having lateral ends connected to said closing sidewalls,
    said internal spar extending between said first closing spar and said second closing spar;
  a mounting system attaching the engine to said box, and
  a thermal protection system comprising a conduit,
  wherein said conduit is housed within said box and is delimited by the first closing spar, by the internal spar, and by the closing sidewalls,
  wherein said thermal protection system comprises at least one air inlet connected to said conduit and opening through one of said closing sidewalls or through said first closing spar, and
  wherein said thermal protection system comprises at least one air outlet connected to said conduit and opening through one of said closing sidewalls or through said first closing spar,
  wherein the inlet and outlet are configured to allow a forward to aft air flow within the conduit within the box so that the forward to aft air flow forms a thermal barrier to protect said box from heat of the engine.

2. The propulsion assembly according to claim 1, in which said mounting system comprises an aft engine attachment, and said rigid structure of the attachment pylon comprises a structural block comprising:
  a fixing plate pressed against said first closing spar and fixed to the first closing spar by means of fasteners passing through the first closing spar and said internal spar, and
  a fixing interface for said aft engine attachment.

3. The propulsion assembly according to claim 2, wherein said thermal protection system comprises spacers connecting said first closing spar to said internal spar, passing through said conduit, each spacer including at least one orifice for one of said fasteners to pass through said structural block.

4. The propulsion assembly according to claim 2, in which a first region of said conduit, located facing said structural block, has a cross section which is widened in a direction from said first closing spar towards said internal spar.

5. The propulsion assembly according to claim 1, wherein an air supply duct, configured to be connected to the airframe of an aircraft, passes through a second region of said conduit, said second region having a cross section which is widened in a direction from said first closing spar towards said internal spar.

6. The propulsion assembly according to claim 1, wherein said mounting system comprises a forward engine attachment having a fixing plate pressed against said first closing spar and fixed to the first closing spar.

7. The propulsion assembly according to claim 1, wherein said thermal protection system comprises a longitudinal partition wall which extends between said first closing spar and said internal spar and which is connected to said closing sidewalls, so as to partition a central region of the conduit into two parts.

8. The propulsion assembly according to claim 1, wherein said box comprises a forward closing rib connecting a forward end of said first closing spar to a forward end of said second closing spar.

9. The propulsion assembly according to claim 1, wherein said box comprises an aft closing rib connecting an aft end of said first closing spar to an aft end of said second closing spar.

10. The propulsion assembly according to claim 1, wherein said box comprises internal stiffening ribs having one end connected to said internal spar and an opposite end connected to said second closing spar.

11. The propulsion assembly according to claim 1, wherein said thermal protection system comprises longitudinal ribs for stiffening against buckling, said longitudinal ribs forming heat exchange fins.

12. The propulsion assembly of claim 1, wherein the propulsion assembly is attached to an aircraft.

13. A propulsion assembly for an aircraft, comprising:
an engine and
an attachment pylon designed for attaching the engine to a wing of the aircraft, said attachment pylon comprising:
   a rigid structure comprising
      a box comprising a first closing spar,
      a second closing spar opposite the first closing spar,
      two closing sidewalls each having a first end fixed to the first closing spar and a second end fixed to the second closing spar, and
      an internal spar having lateral ends connected to said closing sidewalls,
      said internal spar extending between said first closing spar and said second closing spar;
a mounting system attaching the engine to said box, and
a thermal protection system comprising a conduit forming a thermal barrier to protect said box from heat of the engine,
wherein said conduit is housed within said box and is delimited by the first closing spar, by the internal spar, and by the closing sidewall,
wherein said thermal protection system comprises a longitudinal partition wall which extends between said first closing spar and said internal spar and which is connected to said closing sidewalls, so as to partition a central region of the conduit into two parts.

14. A propulsion assembly for an aircraft, comprising:
an engine and
an attachment pylon designed for attaching the engine to a wing of the aircraft, said attachment pylon comprising:
   a rigid structure comprising
      a box comprising a first closing spar,
      a second closing spar opposite the first closing spar,
      two closing sidewalls each having a first end fixed to the first closing spar and a second end fixed to the second closing spar, and
      an internal spar having lateral ends connected to said closing sidewalls,
      said internal spar extending between said first closing spar and said second closing spar;
a mounting system attaching the engine to said box comprising
   an aft engine attachment, and said rigid structure of the attachment pylon comprises a structural block comprising
      a fixing plate pressed against said first closing spar and fixed to the first closing spar by means of fasteners passing through the first closing spar and said internal spar, and
      a fixing interface for said aft engine attachment,
a thermal protection system comprising a conduit forming a thermal barrier to protect said box from heat of the engine, wherein said conduit is housed within said box and is delimited by the first closing spar, by the internal spar, and by the closing sidewalls,
wherein a first region of said conduit, located facing said structural block, has a cross section which is widened in a direction from said first closing spar towards said internal spar.

* * * * *